Dec. 7, 1926.
J. W. WHITE
1,609,749
ELECTRIC WELDING
Filed Dec. 1, 1920
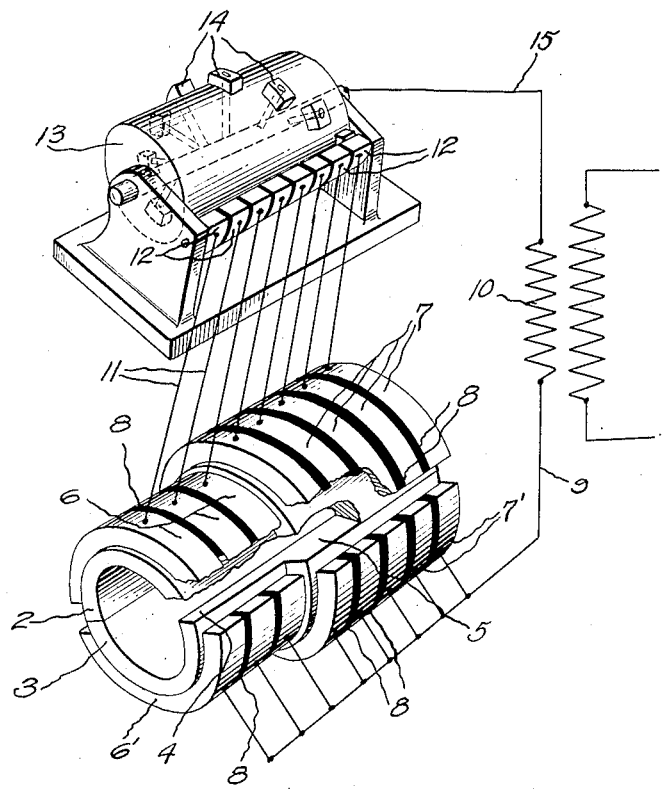
Witness.
Inventor
John W. White
By Attorneys Patented Dec. 7, 1926.

1,609,749

UNITED STATES PATENT OFFICE.

JOHN W. WHITE, OF DETROIT, MICHIGAN, ASSIGNOR TO GENERAL MOTORS CORPORATION, OF DETROIT, MICHIGAN, A CORPORATION OF DELAWARE.

ELECTRIC WELDING.

Application filed December 1, 1920. Serial No. 427,596.

The invention relates to welding of the electrical resistance or butt-welding type and has particular reference to the welding of joints in which a considerable area of surface is to be connected.

In the welding of joints of large area, especially where currents of high amperage are employed, the amount of electrical energy to be expended in simultaneously fusing the material over the entire surface of the joint is necessarily large, and the load imposed on the source of supply is extremely heavy for the brief time required for the welding operation. The fluctuations in the load are therefore excessive and highly undesirable from the standpoint of economy in the production of current.

The primary object of my invention therefore is to provide for the welding of joints of relatively great extent without the imposition of excessive loads on the source of supply. With this object in view the invention contemplates the welding of the joint progressively by distribution of current successively to different portions of the surfaces to be joined. By thus decreasing the area acted upon per unit of time the fluctuations in load are proportionately decreased thus facilitating the use of current of high intensity with its attendant well recognized advantages.

In the accompanying drawing, showing in perspective and in part diagrammatically an embodiment of the principles of my invention, an article to be welded is shown as comprising the two sections 2, 3, which are illustrated as being curved in approximately semi-cylindrical shape and adapted, when joined along their edges, to form a tubular sleeve or the like. The sections are shown as having at different portions of their length different areas of surface to be joined per unit of length, for example, one end of the sections, as at 4, is formed of material of less thickness than the other end, as indicated at 5. It will be seen therefore that a greater area of joint is to be formed and a greater amount of material to be heated or fused per unit of length in one portion of the sections than in another.

The electrodes which are adapted to supply the heating or welding current to the article are indicated at 6, 6', 7, 7'. The electrodes for each half of the article to be welded are constituted of a plurality of sections, three pairs of the sections 6, 6' being shown and five pairs of the sections 7, 7'. The number and arrangement of the sections will vary, of course, with the character of the article and the amount of current available.

The sections 6, 6', which engage and convey current to the thinner portion of the article, are wider than those for the thicker portion of the article, the intention being to cause each electrode section to supply current for the welding of a predetermined and equal area of joint. Insulating material is interposed between successive sections as indicated at 8.

The electrode sections designed to engage one of the sections of the article, as the sections 6', 7', may be connected in parallel to the conductor 9 leading from the low tension coils 10 of a transformer of any usual or suitable type. The sections 6, 7, however, are connected individually, as by conductors 11, to terminals 12 of a switch device adapted to close the circuit successively through the conductors 11. By way of illustration I have shown a rotary switch member 13 carrying contacts 14 connected to the lead 15 of the transformer and adapted to engage successively the terminal contacts 12. The character and details of the switch construction may of course be varied widely, the essential feature being merely that means shall be provided for directing the current successively to different sections of the electrodes. The arrangement of parts is preferably such that the electrode sections will be connected in circuit successively from one end to the other of the article to be heated or welded, so that the operation of welding may be performed progressively from one end of the article to the other. The consumption of electrical energy as will be seen is substantially uniform and is very much less per unit of time than would be the case were the current to be passed through the entire area of joint simultaneously. The fluctuations in the load imposed upon the line are accordingly very much reduced, while it is still rendered possible to utilize a very high current intensity per unit of surface, thus securing the advantages inherent in the rapid heating of the areas to be welded.

While I have above described the electrodes both as being sectional it is evident that one only of the electrodes may be made sectional said sections being arranged to be separately and successively connected to the source of current, the other electrode being in a single piece. If it be desired to limit the path of the current entirely to a single pair of electrode sections at a time, it will be obvious that the sections of both electrodes may be connected through switch devices instead of the sections of one electrode being arranged in parallel as illustrated. It will be understood that various other changes and modifications may be made without departing from the spirit of the invention or the scope thereof as set forth in the appended claims and therefore I do not wish to be limited to the specific details herein described.

I claim:—

1. In apparatus for electric welding the combination of a pair of electrodes formed to fit and hold in fixed position the parts to be welded, one of said electrodes being divided into a plurality of sections all of which maintain engagement with said parts during the welding operation and are adapted to supply current to predetermined overlapping areas of the surfaces to be welded sufficient to raise such areas to welding temperature by resistance of the parts, and means for supplying electric current to said sections successively as the welding operation proceeds from one area to another.

2. In apparatus for producing a continuous weld, the combination of a pair of electrodes formed to receive and hold in fixed position the parts to be welded, one of said electrodes being divided into a plurality of sections separated by insulation, said sections being positioned sufficiently near each other to bring the entire joint to a welding heat and means for supplying current successively to said sections as the welding operation proceeds from one area to another along the joint.

3. In apparatus for electrically welding together sections of an article the walls of which vary in thickness in different portions of the joint, the combination of a sectional electrode adapted to conform to the contour of said article, the electrode sections contacting with the portions of the article whose walls are of greater thickness being of less width, and means for passing current successively through said electrode sections.

4. In electric welding apparatus for welding together two parts requiring different quantities of electrical energy for successive units of length, a pair of electrodes adapted to engage respectively the parts to be welded and conduct thereto current sufficient to raise said parts to welding temperature, one of said electrodes being divided transversely into sections the width of which varies in accordance with the variations in the quantity of energy to maintain substantially uniform load upon the source of energy, and means for supplying current successively to such sections.

5. The method of welding two parts together which comprises holding the parts in engagement between stationary sectional electrodes adapted to supply electric current to different adjoining portions of said parts, and supplying current successively to the sections of said electrodes to raise the temperature of said portions to the welding temperature progressively along the joint, the heated portions being sufficiently close to produce continuous weld.

In testimony whereof I affix my signature.

JOHN W. WHITE.